United States Patent
Cracco (10) Patent No.: US 11,920,481 B2
(45) Date of Patent: Mar. 5, 2024

(54) MODULE FOR TURBOMACHINE (71) Applicant: SAFRAN AERO BOOSTERS SA, Herstal (BE)

(72) Inventor: Cédric Carl Nathan Cracco, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 0 days.

(21) Appl. No.: 17/785,217

(22) PCT Filed: Dec. 18, 2020

(86) PCT No.: PCT/EP2020/086997
§ 371 (c)(1),
(2) Date: Jun. 14, 2022

(87) PCT Pub. No.: WO2021/123146
PCT Pub. Date: Jun. 24, 2021

(65) Prior Publication Data
US 2023/0030587 A1 Feb. 2, 2023

(30) Foreign Application Priority Data
Dec. 18, 2019 (BE) .................. 2019/5933

(51) Int. Cl.
F01D 17/16 (2006.01)
F02C 9/20 (2006.01)
(Continued)

(52) U.S. Cl.
CPC ............... *F01D 17/16* (2013.01); *F02C 9/20* (2013.01); *F01D 9/041* (2013.01); *F01D 9/065* (2013.01);
(Continued)

(58) Field of Classification Search
CPC ...... F01D 17/162; F01D 17/16; F01D 25/162; F01D 9/041; F01D 9/065; F01D 9/02; F04D 29/563; F04D 29/544; F02C 9/20
See application file for complete search history.

(56) References Cited

U.S. PATENT DOCUMENTS 3,990,810 A * 11/1976 Amos .................. F01D 17/162
415/161
4,793,770 A * 12/1988 Schonewald ............. F01D 9/04
415/220
(Continued)

FOREIGN PATENT DOCUMENTS

EP 0942150 A2 9/1999
EP 3361058 A1 8/2018
(Continued)

OTHER PUBLICATIONS

International Search Report for PCT/EP2020/086997 dated Mar. 5, 2021.
Written Opinion for PCT/EP2020/086997 dated Mar. 5, 2021.

*Primary Examiner* — Justin D Seabe
*Assistant Examiner* — Behnoush Haghighian
(74) *Attorney, Agent, or Firm* — Sandberg Phoenix & von Gontard PC (57) ABSTRACT

A turbomachine compressor module, comprising an annular array of structural arms defining inter-arm spaces between two circumferentially adjacent arms; and an annular array of stator vanes with variable orientation about a respective axis (A) and disposed at least partially within the inter-arm spaces. The arms are provided with flaps pivotable about a respective axis (B). Also, a turbomachine provided with such a module and a row of rotor blades directly downstream of the module.

16 Claims, 5 Drawing Sheets

(51) Int. Cl.
*F01D 9/04* (2006.01)
*F01D 9/06* (2006.01)
*F01D 25/16* (2006.01)
*F04D 29/54* (2006.01)
*F04D 29/56* (2006.01)

(52) U.S. Cl.
CPC .......... *F01D 17/162* (2013.01); *F01D 25/162* (2013.01); *F04D 29/544* (2013.01); *F04D 29/563* (2013.01); *F05D 2220/32* (2013.01); *F05D 2240/12* (2013.01); *F05D 2260/60* (2013.01)

(56) References Cited

U.S. PATENT DOCUMENTS

| | | | | |
|---|---|---|---|---|
| 4,989,406 | A * | 2/1991 | Vdoviak | F01D 25/162 415/209.1 |
| 6,082,966 | A * | 7/2000 | Hall | F01D 25/162 415/209.1 |
| 7,549,839 | B2 * | 6/2009 | Carroll | F01D 5/148 415/161 |
| 8,182,204 | B2 * | 5/2012 | Durocher | F01D 5/142 415/115 |
| 8,347,633 | B2 * | 1/2013 | Smith | F01D 17/162 60/771 |
| 8,757,965 | B2 * | 6/2014 | Baralon | F01D 25/162 415/209.1 |
| 9,068,460 | B2 * | 6/2015 | Suciu | F01D 1/04 |
| 9,617,864 | B2 * | 4/2017 | Firnhaber | F04D 29/563 |
| 9,835,038 | B2 * | 12/2017 | Paradis | F01D 9/042 |
| 9,909,434 | B2 * | 3/2018 | Tsifourdaris | F01D 9/04 |
| 10,221,707 | B2 * | 3/2019 | Paradis | F01D 9/02 |
| 10,221,720 | B2 * | 3/2019 | Nolcheff | F01D 9/02 |
| 10,267,170 | B2 * | 4/2019 | Clark | F01D 9/041 |
| 10,287,889 | B2 * | 5/2019 | Moradi | F01D 5/146 |
| 10,563,513 | B2 * | 2/2020 | Kalitzin | F01D 5/147 |
| 10,577,956 | B2 * | 3/2020 | Northall | F01D 5/141 |
| 10,697,471 | B2 * | 6/2020 | Northall | F01D 25/162 |
| 10,718,221 | B2 * | 7/2020 | Rice | F01D 17/148 |
| 10,815,802 | B2 * | 10/2020 | Prasad | F01D 9/041 |
| 11,193,380 | B2 * | 12/2021 | Paradis | F01D 9/02 |
| 2006/0275110 | A1 * | 12/2006 | Baralon | F01D 9/041 415/191 |
| 2007/0092372 | A1 * | 4/2007 | Carroll | F01D 5/148 415/191 |
| 2010/0272566 | A1 * | 10/2010 | Durocher | F01D 25/24 415/208.2 |
| 2013/0051996 | A1 * | 2/2013 | Hoeger | F01D 9/06 415/185 |
| 2013/0259672 | A1 * | 10/2013 | Suciu | F01D 1/04 415/208.1 |
| 2013/0330180 | A1 * | 12/2013 | Guendogdu | F01D 5/186 415/182.1 |
| 2014/0255159 | A1 * | 9/2014 | Paradis | F01D 9/02 415/115 |
| 2014/0314549 | A1 * | 10/2014 | Pakkala | F01D 17/162 415/148 |
| 2016/0017739 | A1 * | 1/2016 | Firnhaber | F01D 17/162 415/209.1 |
| 2016/0061054 | A1 * | 3/2016 | Nolcheff | F02C 7/04 60/726 |
| 2017/0022832 | A1 * | 1/2017 | Tsifourdaris | F01D 9/065 |
| 2017/0022835 | A1 * | 1/2017 | Clark | F01D 9/06 |
| 2017/0058691 | A1 * | 3/2017 | Rice | F01D 5/146 |
| 2018/0252113 | A1 * | 9/2018 | Northall | F01D 5/142 |
| 2018/0252231 | A1 * | 9/2018 | Northall | F04D 29/544 |
| 2019/0078466 | A1 * | 3/2019 | Nolcheff | F23R 3/26 |
| 2019/0093482 | A1 * | 3/2019 | Moradi | F01D 5/146 |
| 2019/0107046 | A1 * | 4/2019 | Bowden | F01D 25/162 |
| 2019/0186501 | A1 * | 6/2019 | Kalitzin | F01D 5/147 |
| 2020/0191004 | A1 * | 6/2020 | Prasad | F01D 17/16 |
| 2021/0172373 | A1 * | 6/2021 | Anand | F01D 17/162 |
| 2022/0106907 | A1 * | 4/2022 | Bowden | F01D 25/162 |

FOREIGN PATENT DOCUMENTS

| | | |
|---|---|---|
| EP | 3502416 A1 | 6/2019 |
| GB | 2405184 A | 2/2005 |

* cited by examiner

Fig. 1 STATE OF THE ART

MODULE FOR TURBOMACHINE

The present invention is the US national stage under 35 U.S.C. § 371 of International Application No. PCT/EP2020/086997 which was filed on Dec. 18, 2020, and which claims the priority of application BE2019/5933 filed on Dec. 18, 2019 the contents of which (text, drawings and claims) are incorporated here by reference in its entirety.

FIELD

The invention relates to a turbomachine assembly. More specifically, the invention relates to a compressor module comprising radial arms and stator vanes.

BACKGROUND

An axial turbomachine compressor casing may comprise a structural section consisting essentially of an outer ring, a central hub and structural arms, so-called "struts", extending radially between the hub and the ring. The structural casing forms a supporting structure for the reactor. It is usually a one-piece casting and the cross section airflow passage has the shape of a goose-neck.

Upstream and downstream of the gooseneck are generally two annular rows of stator vanes.

FR 3 032 480 A1 describes a structural casing design in which the structural arms have an identical upstream profile to the upstream profile of blades axially aligned therewith.

Such a design may require a row of stator vanes to be arranged downstream of the arms in order to direct the airflow appropriately for subsequent stages of the compressor and in particular for the first rotor blades of the compressor downstream of the casing.

This design is also cumbersome and there is still room for improvement to reduce the overall length of the turbine engine.

SUMMARY

The objective of the invention is to improve the compactness of the turbomachine without impairing the flow of air.

The invention relates to a compressor module for a turbomachine, comprising: a substantially axisymmetric central hub; an outer ring, arranged in a coaxial position with the central hub; an annular row of arms extending from the central hub to the outer ring and defining inter-arm spaces between two circumferentially adjacent arms; and an annular row of stator vanes extending from the central hub to the outer ring and disposed at least partially in the inter-arm spaces; wherein the stator vanes are rotatable about a respective axis of each vane and each arm has a fixed, upstream portion and a downstream flap rotatable about a respective axis at each flap.

Thus, the variable stator vanes (VSV) are provided in axial overlap with the arms. This entire arrangement can be formed in the gooseneck portion of the structural casing.

The arms and vanes can have complex shapes and can extend in an average direction from the central hub to the outer ring which can be substantially radial and/or normal to the surfaces of the central hub and/or of the outer ring that guide the airflow.

Similarly, the pivot axis of the vanes can be substantially radial.

The upstream portion and the downstream flap can have a continuity of air guiding surface. The pivot axis of the flap is adjacent to the upstream portion so that pivoting of the flap does not lead to a discontinuity in the air guidance.

The flaps make it possible to obtain a more circumferentially homogeneous flow at the outlet of the module and limit the risk of turbulence at the outlet of the module.

According to an exemplary advantageous embodiment, the vanes and the flaps have respective trailing edges, and the vanes and the flaps are such that there is at least one pivoting position of the vanes and/or flaps in which the respective trailing edges share a common axial position. Thus, the axial overlap of the arms and vanes is total: the vanes do not extend further downstream than the arms (including their flaps). This allows maximum compactness of the compressor module and consequently of the turbomachine. The trailing edge of the flap and the trailing edge of the vanes can in various instances have the same axial position for all angular orientations of the flap and of the vanes.

According to an exemplary advantageous embodiment of the invention, each arm has a suction side (extrados) and a pressure side (intrados). In this case, the arms—together with the rotor blades upstream and downstream—participate in the compression of the airflow, possibly also allowing the vanes to be axially shorter for the same compression ratio.

According to an exemplary advantageous embodiment of the invention, each arm has a section of which at least one portion is symmetrical with respect to an axis parallel to the hub axis and/or at least one portion that is asymmetrical with respect to an axis parallel to the hub axis. For example, an upstream portion of the arm can be symmetrical, directing the airflow purely axially, and a downstream portion can be non-axisymmetrical and deflect the airflow.

According to an exemplary advantageous embodiment of the invention, each arm has a cross-section of which a portion is symmetrical with respect to an axis that is not parallel to the hub axis. Thus, the arms can participate in the deflection of the flow. The flow leaving the arms is no longer necessarily axial.

According to an exemplary advantageous embodiment of the invention, at least one of the flaps has a cross-section that is substantially identical to the cross-section of at least one of the vanes.

According to an exemplary advantageous embodiment of the invention, at least one of the flaps has a cross-section different from the cross-section of at least one of the vanes, in particular the thickness of each flap is at least twice the thickness of each vane. The thickness can for example be measured perpendicular to the chord line connecting the leading edges to the trailing edges of the vanes or arms.

According to an exemplary advantageous embodiment of the invention, the cross-section of the vanes is identical for all the vanes of the row of vanes and/or the cross-section of the arms is not identical for all the arms. For example, one or more arms with a larger cross-section can be provided, for example to accommodate a lubrication line for the bearings or for the gearbox. The larger arm(s) can, for example, be located in the circumferential part of the module which is intended to be at the bottom, in the normal operating direction of the assembled module in the turbomachine.

According to an exemplary advantageous embodiment of the invention, two annular rows of stator vanes axially spaced from each other are arranged in the inter-arm spaces. Thus, the stator row upstream of the arms and the stator row downstream of the arms can be shifted axially into the inter-arm spaces.

According to an exemplary advantageous embodiment of the invention, a common actuating mechanism controls the orientation of the vanes and the pivoting motion of the flaps. This mechanism can be integrated into the module and thus saves space on the outer shell directly downstream of the module.

According to an exemplary advantageous embodiment of the invention, at least two actuating mechanisms are arranged to orient a first group of stator vanes according to one orientation and a second group of stator vanes of the same annular row of stator vanes according to an orientation different from the orientation of the first group.

According to an exemplary advantageous embodiment of the invention, between the central hub and the outer ring extends a gooseneck-shaped air passage, the module being intended to be located between two compressors of a turbomachine.

According to an exemplary advantageous embodiment of the invention, the chord line of the arms is 6 to 10 times greater than the chord of the stator vanes.

According to an exemplary advantageous embodiment of the invention, the thickness of the arms is between 2 and 5 times greater than the thickness of the stator vanes.

The invention also relates to an axial turbomachine comprising a low-pressure compressor and/or a high-pressure compressor, provided with a module according to one of the embodiments set out above, the turbomachine comprising a row of rotor blades directly downstream of the module.

Thus, there is no row of stator vanes between the structural casing and the first rotor of the compressor.

Bringing a row of variably oriented stator vanes upstream to overlap the structural arms allows a gain in axial compactness of the turbomachine while ensuring an optimal compression ratio and thus compressor efficiency. Also, the flow is appropriately directed thanks to the orientation of the vanes.

DETAILED DESCRIPTION

In the following description, the terms "internal" and "external" refer to a positioning with respect to the axis of rotation of a turbomachine. The axial direction is the direction along the axis of rotation of the turbomachine. The radial direction is perpendicular to the axis of rotation. "Upstream" and "downstream" refer to the main flow direction of the flow in the turbomachine. The term "integral" is understood as integral in rotation.

Figure 1:
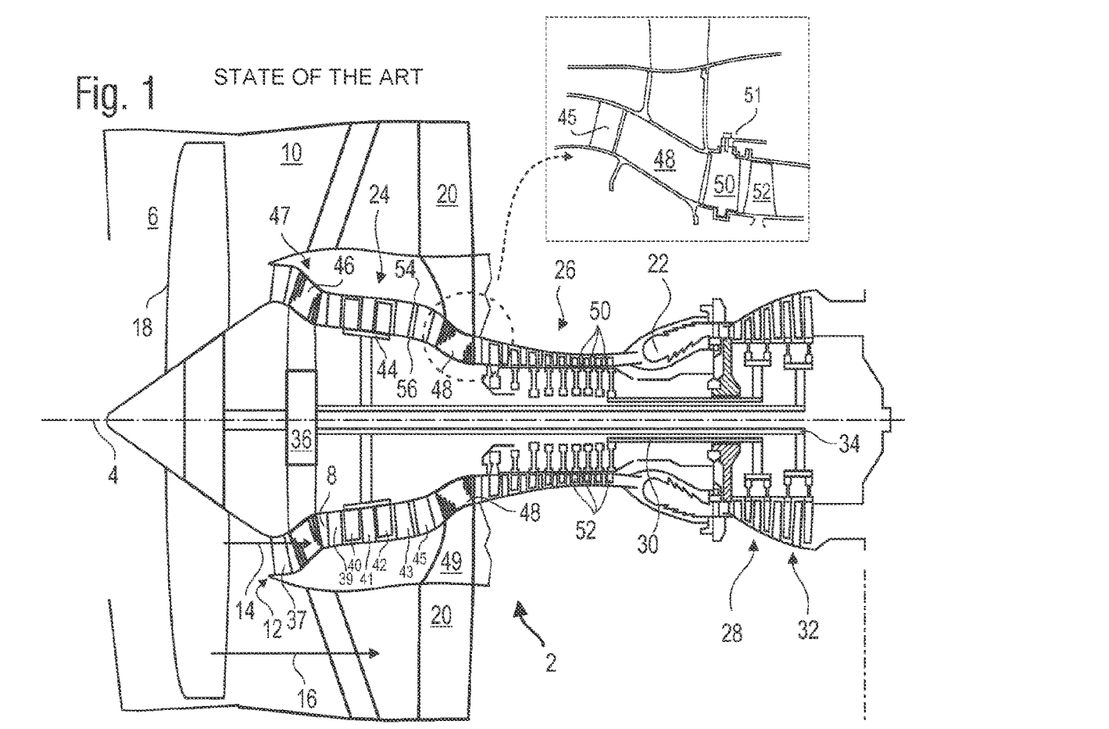
FIG. 1 exemplarily shows a turbomachine of prior art.

FIG. 1 is a simplified representation of an axial turbomachine of the state of the art. In this case, it is a dual-flow turbojet engine 2.

The turbomachine 2 has an axis of rotation 4. An annular inlet 6 divides into a primary flow path 8 and a secondary flow path 10 at a circular separation nozzle 12. A primary flow 14 and a secondary flow 16 pass through these paths 8 and 10 respectively, and meet again at the outlet of the turbomachine 2. The primary flow 14 and the secondary flow 16 are coaxial annular flows and are fitted into each other. They are channelled by the internal and external walls of the turbomachine 2.

The secondary flow 16 is accelerated by a fan 18 arranged at the inlet 6, in order to generate thrust for the flight of an aircraft. Straightening blades 20 can be arranged in the secondary flow path 10 and configured to increase the axial component of the secondary flow velocity vector. The fan 18 is arranged upstream of the primary duct 8 and the secondary duct 10.

Alternatively, the fan can be of the non-ducted type, for example a counter-rotating twin rotor. It can be placed around the primary duct.

The turbomachine 2 comprises a compression zone formed by two compressors 24, 26, a combustion chamber 22 and an expansion zone 28, 32. The compressors 24, 26 consist of a low-pressure compressor 24 and a high-pressure compressor 26.

The high-pressure compressor 26 can be placed at the inlet of the combustion chamber 22.

Downstream of the combustor 22, the turbomachine 2 can have a high-pressure turbine 28 coupled to a high-pressure shaft 30, and then a low-pressure turbine 32 coupled to a low-pressure shaft 34. The latter can be rotationally independent from the high-pressure shaft 30. These turbines 28, 32 can form the expansion zone of the primary flow 14.

In operation, the mechanical power received by the turbines 28, 32 is transmitted to the shafts 30, 34 which set the compressors 24, 26 into motion. These compressors comprise several rows of rotor blades associated with rows of stator vanes. The rotor blades are integrally or kinematically driven by the shafts 30, 34 about the axis of rotation 4 to generate a flow of air and progressively compress it up to the inlet of the combustion chamber 22.

The turbomachine can include gearing means, such as a reduction gear 36 which drives the fan 18 at a lower speed than the rotor blades. In this way, two turbines are sufficient to drive the compressors and the fan at three different respective speeds.

In this example, the low-pressure compressor 24 comprises two rows of rotor blades 40, 42 attached to the shaft 34 via a rotor 44.

The compressor 24 includes stator vanes 39, 41 interposed between the rotor blades 40, 42.

The compressor 24 can comprise alternating stator vanes and rotor blades, or as in the illustrated example, two successive rows of stator vanes 43, 45 in its downstream portion. The set of stator vanes 39, 41, 43, 45 forms the rectifier 35 of the compressor 24.

The stator of the turbomachine 2 can comprise a plurality of support casing modules, including an upstream module 47 and a downstream module 49 arranged on either side of the compressor 24. These modules 47, 49 can comprise annular sleeves forming sections of the primary duct 8 and can have struts 46, 48 extending radially through the duct 8. The annular sleeves can have gooseneck profiles. They can mark significant reductions in the diameter of the primary path 8.

The upstream module 47 and its arms 46 can support the gearbox 36.

Upstream of the arms 46 is a row of stator vanes 37 near the nozzle 12. Downstream of the arms 48 is the high-pressure compressor 26 with stator vanes 50 and rotor blades 52. The latter are driven in rotation by means of the shaft 30.

In general, rows of stator vanes are arranged directly upstream and directly downstream of the arms 46, 48, so that the air that flows through the inter-arm spaces has a speed vector with no tangential component (it is a substantially axial flow). These rows can or cannot be variable vane rows, i.e., their orientation around a radial axis is adjustable. These vanes are supported by an outer and inner shroud downstream or upstream of the structural casings 47, 49.

A portion at the top right of FIG. 1 shows an enlarged view of the inlet of the high-pressure compressor 26. In particular, it shows the succession, in the direction of flow, of an annular row of arms 48, followed by an annular row of stator vanes 50 whose orientation is variable by means of a device 51. A first row of rotor blades 52 is also shown downstream of the variable stator vanes 50.

Figure 2:
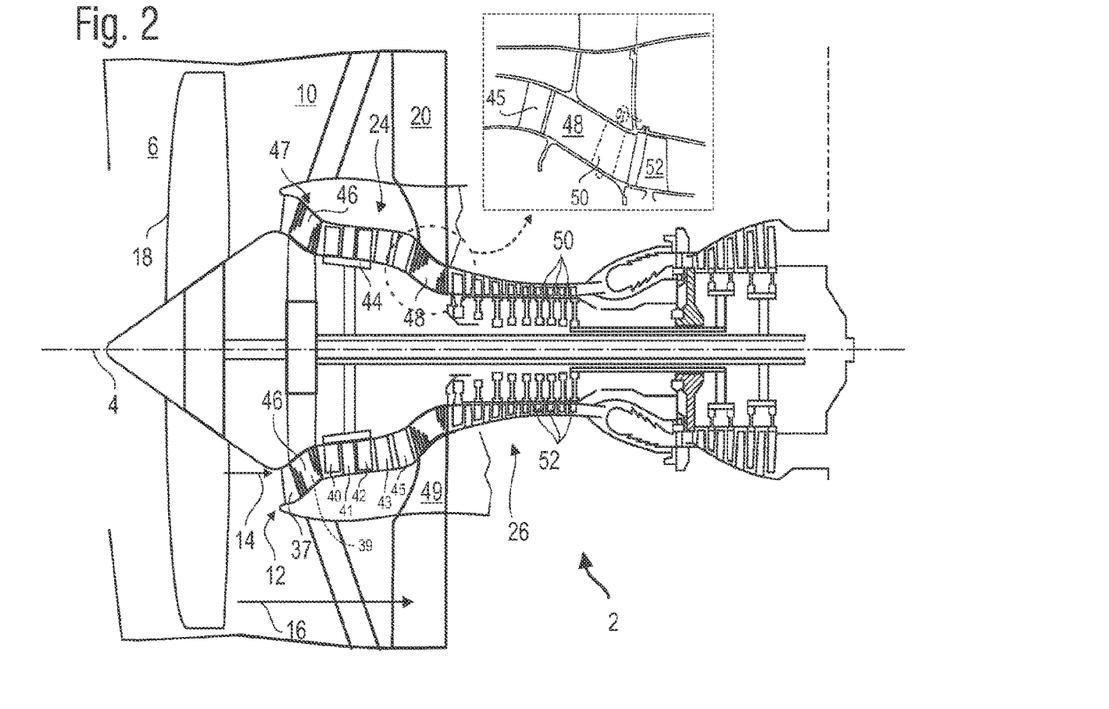
FIG. 2 exemplarily shows a turbomachine according to various embodiments of the invention.

FIG. 2 shows a turbomachine according to the invention.

This turbomachine differs from the turbomachine known in the state of the art essentially through the design of the modules 47 and 49. One, the other or both structural modules 47, 49 can comprise at least one row of stator vanes axially overlapping the structural arms 46, 48.

Thus, as can be seen from a comparison between the length of the turbomachine in FIG. 2 and FIG. 1 (see mixed line at bottom right of FIG. 1 and top right of FIG. 2), the incorporation of stator vanes in the casing allows for a gain in length of the turbomachine.

FIG. 2 shows the vanes 37 partially overlapping the arms 46 and the vanes 39 fully integrated between the arms 46. Alternatively, the vanes 39 can be only partially at the axial level of the arms 46 and/or the vanes 37 can be upstream of the arms 46.

The same modifications can be made, in addition or alternatively, to the arms 48 of the module 49. A magnified view shows the variable stator vanes 50 at the inlet of the high-pressure compressor 26 which axially overlap the arms 48. Thus, the rotor blades 52 can be placed directly after the arms 48.

Figure 3:
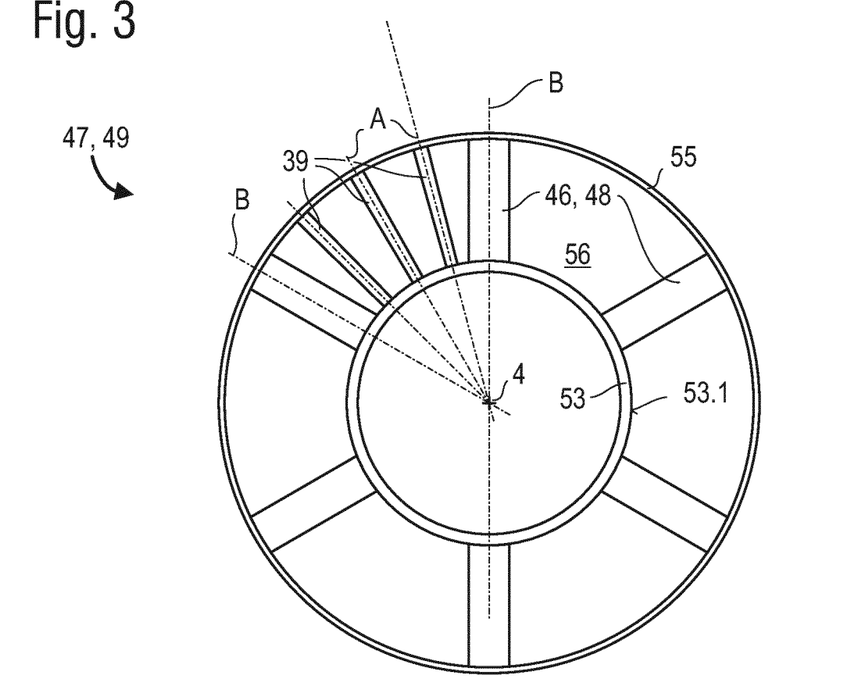
FIG. 3 exemplarily sketches the compressor module according to various embodiments of the invention in a section view that is perpendicular to the axis of the turbomachine.

FIG. 3 shows a view of module 47 or 49 in a cross-section perpendicular to axis 4. The module 47, 49 consists of the arms 46 or 48, the vanes 37, 39 or 45, a hub 53 and an outer ring 55. In the following, reference numbers relating to module 47 will be used. The person skilled in the art will understand that the same teachings can be applied, alternatively or in combination, to module 49.

The arms 46 define, circumferentially between two adjacent arms 46, inter-arm spaces 56.

For clarity, only three vanes 39 are shown in FIG. 3 in an inter-arm space 56. Several and in various instances all inter-arm spaces 56 accommodate equal or different numbers of vanes 39, in various instances evenly spaced circumferentially.

The central hub 53 has an outer surface 53.1 which can be substantially conical. The outer surface 53.1 can also be curved, or even have a point of inflection, so that the stream of air flowing through the module 47 resembles a "goose neck". The upstream diameter of the hub 53 is larger than its downstream diameter.

The arms 46 are in various instances evenly distributed angularly around the central hub 53. Alternatively, more arms 46 or arms of greater circumferential thickness can be provided in the lower half of the module (in the direction of mounting the compressor on the aircraft).

The individual parts of the module 47 can be joined together by welding, for example laser or electron beam welding.

The vanes integrated in the module 47 and in particular the vanes 39 can be rotatable about an axis A respective of each vane, which is shown here as radial. An actuating mechanism (not shown) common to all the vanes—for example a ring and linkage system—allows the vanes to be rotated about their axis A. Alternatively, one group of blades can be rotated through a given angle by means of an actuation mechanism while another group of blades in the same annular row of blades can be rotated through another given angle about their respective A-axes.

The blade orientation actuation mechanism can be, for example, the one illustrated in EP 3 361 058 A1. A number of actuating mechanisms in the form of independent coaxial timing rings allow the vanes to be rotated to different angles, each ring engaging a group of links linked to the vanes in a group of vanes.

For example, the vanes that are adjacent to the arms can be tilted at a different angle than the vanes that are not adjacent to the arms to compensate for the greater circumferential thickness of the arms than the blades. This can allow for homogeneity of the air passages circumferentially.

For the same reason, the vanes can have different profiles, depending on whether they are located near the arms or further away circumferentially, towards the centre of the inter-arm space. As the arms have a greater circumferential thickness than the vanes, a gradual (step-wise) increase in the thickness of the vanes, from one vane to the neighbouring vane, can be envisaged to approach the thickness of the arms progressively.

The arms 46, 48 extend generally along an axis B respective to each arm 46, 48. The axis B is shown here radially (perpendicularly to the axis 4).

Figure 4:
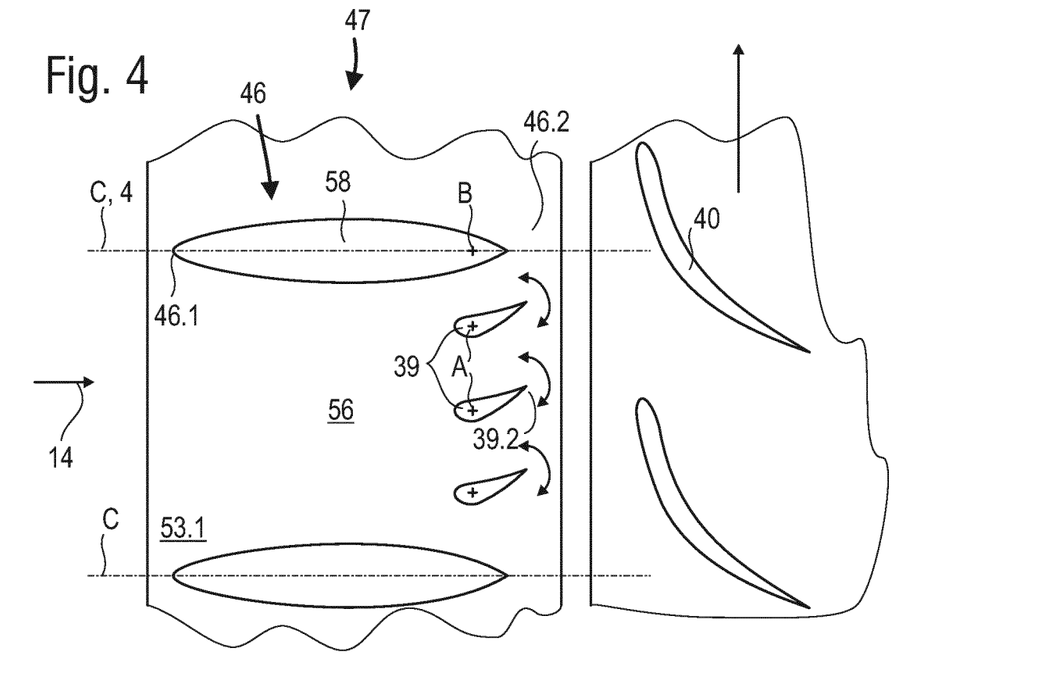
FIG. 4 exemplarily illustrates a partial view of the module according to various embodiments of the invention, seen radially from outward.

FIG. 4 shows a partial view of the module 47 along an axis B, viewed radially from the outside. It shows the outer surface 53.1 of the hub and the inter-arm space 56, between two circumferentially adjacent arms 46. Arrow 14 represents the general direction of flow which is substantially axial (parallel to axis 4) into or out of the compressor.

A portion of the rotor is shown on the right-hand side of FIG. 4 with the blades 40 and an arrow indicating the direction of rotation of the rotor.

The arm 46 has a leading edge 46.1 and a trailing edge 46.2.

In the inter-arm space 56 are arranged blades 39. In this example, the vanes 39 are completely enclosed within this space 56. There can be an angular position of the vanes 39 in which the trailing edges 46.2 of the arms are substantially axially aligned with the trailing edges 39.2 of the vanes 39.

Figure 6:
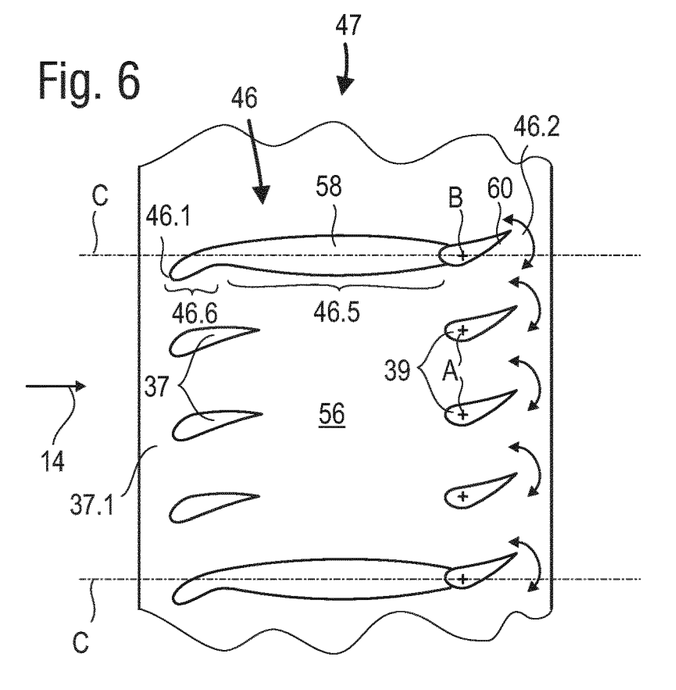

Alternatively or in combination, vanes can be arranged aside the upstream portion 58 and can have a leading edge aligned with the leading edge 46.1 of the arms (see vanes 37 in FIG. 6).

Due to the integration of the blades 39 in the inter-arm spaces, the airflow 14 can encounter rotor blades (see 40 or 52 in FIG. 1) directly downstream of the module 47.

Figure 5:
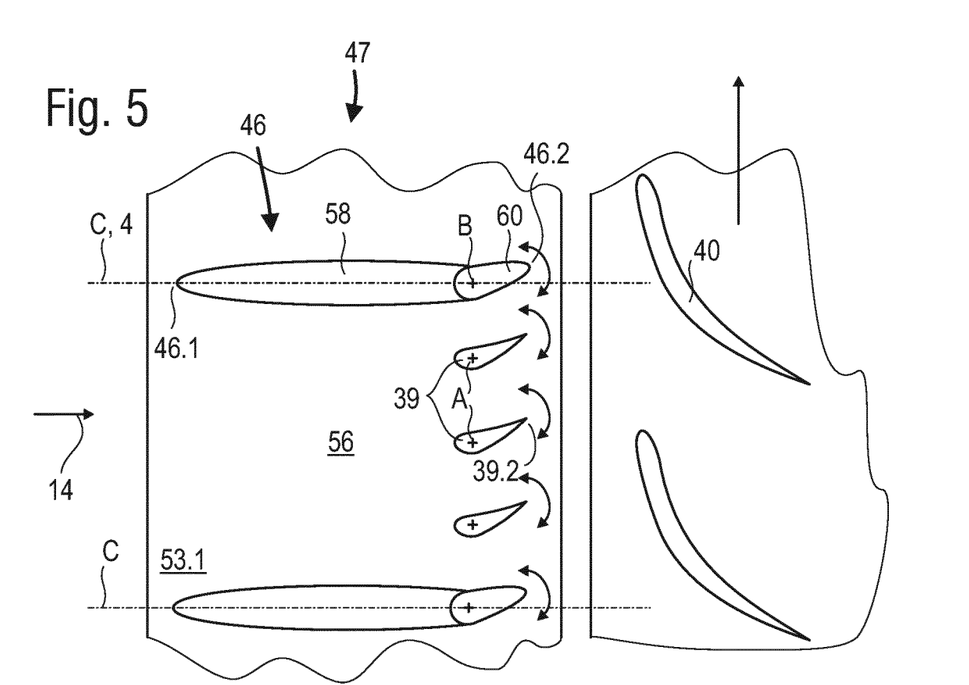
FIGS. 5 to 9 exemplarily show various examples of embodiments of the module of the invention.

FIG. 5 shows another embodiment of the invention. FIG. 5 differs from FIG. 4 in that the arm 46 is made up of a fixed upstream portion 58 and a pivotable downstream portion, or flap 60. The flap 60 pivots along the axis B, which is radial and passes through the arm 46. The pivoting of the flaps 60 can be controlled by the same actuating mechanism that steers the blades 39 or controls a blade group 39 as described above.

The axis B can be at an axial position between 60 and 90% of the chord line of the arms.

The upstream portion 58 can be substantially symmetrical about an axis C that is parallel to the axis 4 of the turbomachine 2 or about a leading-edge-tailing-edge axis of the arms in an unactuated position of the flaps 60.

The flap 60 can have a profile (in this cross-sectional view) that is different from the profile of the blades 39. For example, the flap 60 can be at least twice as thick as the vanes 39 (in a direction perpendicular to the chord line of the flap or vanes). Alternatively (see FIGS. 6 to 8), the flap 60 can have a profile that is identical to the profile of the vanes, in this cross-sectional view perpendicular to the axis B.

Figure 7:
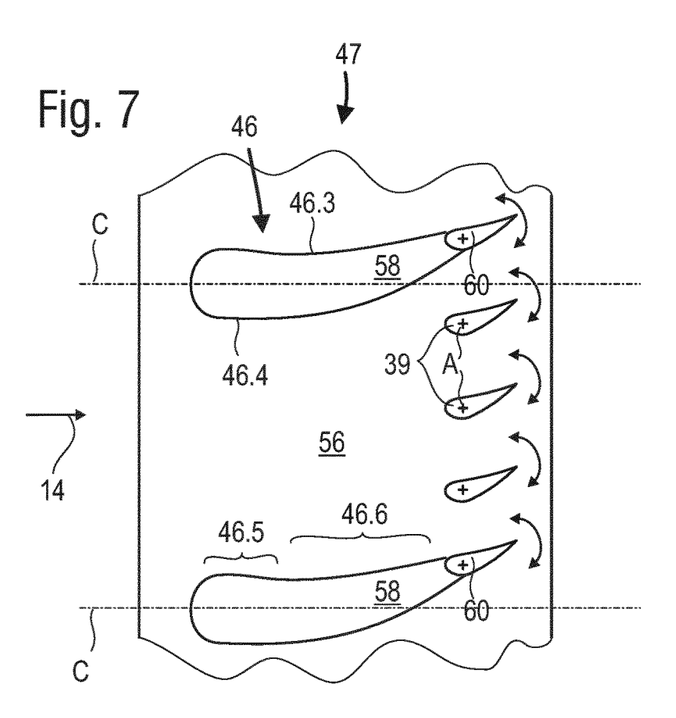
Figure 8:
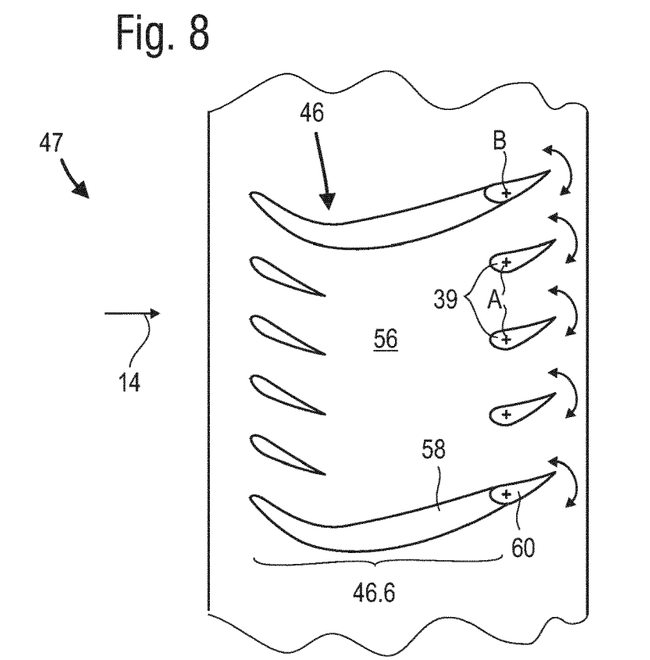

FIGS. 6 to 8 illustrate further examples of profiles for the arm and vanes.

In particular, FIG. 6 illustrates a portion 46.5 of the arm which is symmetrical with respect to the axis C and an upstream portion 46.6 which is asymmetrical with respect to the axis C. The upstream portion 46.6 has in this example a profile which corresponds to that of the vanes 37, arranged here completely in the inter-arm space 56.

The vanes 37, like the vanes 39, can have profiles that are not identical around the entire circumference of the module, or have orientations that are not identical around the entire circumference of the module.

In the example shown in FIG. 7, the portion 46.5 that is symmetrical with respect to axis C, is arranged upstream. The arm comprises an intrados (pressure surface) 46.3 and an extrados (suction surface) 46.4. In this example, in addition to the flap 60, the fixed part 58 participates in the compression of the air flow.

FIG. 8 shows an embodiment where the arm does not have any portion that is symmetrical to an axis.

Figure 9:
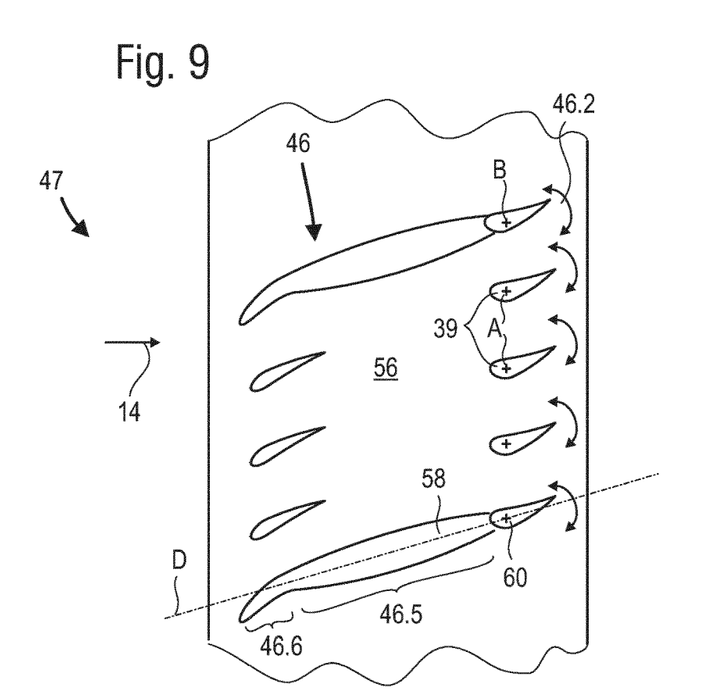

FIG. 9 shows a further example. Two rows of stator vanes 37, 39 are arranged in the inter-arm space 56. Only one of the rows 39 has a variable orientation.

A portion 46.5 of the arm profile 46 is symmetrical about an axis D which is inclined with respect to the axis 4 of the turbomachine 2 and which can form an angle of 15° to 40° relative to the axis 4.

The person skilled in the art will recognise that the various embodiments shown here can be combined and the teaching of one embodiment can be applied to all other embodiments.

Also, the examples illustrated show three vanes between two adjacent arms. Other numbers of vanes can be provided, especially when the arms are irregularly angularly spaced apart from each other. Advantageously, a number of vanes between 3 and 10 is chosen in each inter-arm space.

In the examples shown, the axes A and B are represented as being radial for convenience of representation and understanding of the concepts of the invention. Nevertheless, the invention is not limited to purely radial axes A and B and in particular an inclination with respect to axis 4 (seen in a plane such as that of FIG. 2) or an offset (axes A and/or B not passing through axis 4 in FIG. 3) are also possible.

The invention claimed is:

1. A module for a compressor of a turbomachine, said module comprising:
    a substantially axisymmetric central hub;
    an outer ring, arranged in a coaxial position with the central hub;
    an annular row of arms extending from the central hub to the outer ring and defining inter-arm spaces between two circumferentially adjacent arms of the annular row of arms; and
    an annular row of upstream stator vanes and an annular row of downstream stator vanes, extending from the central hub to the outer ring and arranged at least partially in the inter-arm spaces;
    wherein the upstream and downstream stator vanes are orientable around a respective axis of each stator vane, and wherein each arm of the row of arms has an upstream portion that is stationary and each arm of the row of arms has a downstream flap that is pivotable about a respective axis of each downstream flap; and
    wherein each arm has an upstream portion that is asymmetrical with respect to an axis of symmetry of the hub and that has a profile corresponding to a profile of the upstream stator vanes.

2. The module according to claim 1, wherein the downstream stator vanes and the downstream flaps have respective trailing edges, and the downstream stator vanes and the downstream flaps are positioned in such a manner that there is at least one pivoting position of the downstream stator vanes and of the downstream flaps in which the respective trailing edges of the downstream stator vanes and of the downstream flaps share a same axial position.

3. The module according to claim 1, wherein each arm has a cross section of which at least one portion is symmetrical with respect to an axis that is parallel to the axis of symmetry of the hub.

4. The module according to claim 1, wherein each arm has a cross section of which at least one portion is asymmetrical with respect to an axis that is parallel to the axis of symmetry of the hub.

5. The module according to claim 1, wherein each arm has a suction side and a pressure side.

6. The module according to claim 1, wherein each arm of the annular row of arms has a cross section of which a portion is symmetrical with respect to an axis that is not parallel to the axis of symmetry of the hub.

7. The module according to claim 1, wherein at least one of the downstream flaps has a cross section that is substantially identical to the cross section of at least one of the downstream stator vanes.

8. The module according to claim 7, wherein the cross section of all the downstream flaps is identical to the cross section of all the downstream stator vanes.

9. The module according to claim 1, wherein the thickness of each downstream flap is at least twice the thickness of each downstream stator vane.

10. The module according to claim 1, wherein the cross section of the downstream stator vanes is identical for all the downstream stator vanes of the row of downstream stator vanes and the cross section of the arms is not identical for all the arms.

11. The module according to claim 1, wherein a space between the central hub and the outer ring defines a path for an air flow that has a goose-neck shape.

12. The module according to claim 1, wherein a common actuation mechanism controls the orientation of the downstream stator vanes and controls the pivoting motion of the downstream flaps.

13. The module according to claim 1, wherein at least two actuation mechanisms are arranged to orient a first group of downstream stator vanes according to one orientation and a second group of downstream stator vanes of the same annular row of downstream stator vanes in a different orientation from that of the first group.

14. The module according to claim 1, wherein the chord line of the arms is 6 to 10 times greater than the chord line of the stator vanes.

15. The module according to claim 1, wherein the thickness of the arms is between 2 and 5 times greater than the thickness of the stator vanes.

16. A turbine engine, said engine comprising:
    a low-pressure compressor;
    a high-pressure compressor;

a module arranged axially between the low-pressure compressor and the high-pressure compressor, the module comprising:
  a substantially axisymmetric central hub;
  an outer ring, arranged in a coaxial position with the central hub;
  an annular row of arms extending from the central hub to the outer ring and defining inter-arm spaces between two circumferentially adjacent arms of the annular row of arms; and
  an annular row of upstream stator vanes and an annular row of downstream stator vanes, extending from the central hub to the outer ring and arranged at least partially in the inter-arm spaces;
  wherein the stator vanes are orientable around a respective axis of each stator vane, and wherein each arm of the row of arms has an upstream portion that is stationary and each arm of the row of arms has a downstream flap that is pivotable about a respective axis of each downstream flap;
  wherein each arm has an upstream portion that is asymmetrical with respect to an axis of symmetry of the hub and that has a profile corresponding to a profile of the upstream stator vanes; and
  a row of rotor blades arranged directly downstream of the module.

* * * * *